United States Patent
Nagareda et al.

(10) Patent No.: US 12,392,648 B2
(45) Date of Patent: Aug. 19, 2025

(54) FLOWMETER SENSOR

(71) Applicant: HONDA ELECTRONICS CO., LTD., Aichi (JP)

(72) Inventors: Kenji Nagareda, Aichi (JP); Yuya Ishiguro, Aichi (JP); Katsuyuki Inagaki, Aichi (JP); Hiromasa Tomura, Aichi (JP); Yuki Murai, Aichi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 18/288,052

(22) PCT Filed: Sep. 26, 2022

(86) PCT No.: PCT/JP2022/035770
§ 371 (c)(1),
(2) Date: Jan. 4, 2024

(87) PCT Pub. No.: WO2024/069718
PCT Pub. Date: Apr. 4, 2024

(65) Prior Publication Data
US 2025/0216233 A1 Jul. 3, 2025

(51) Int. Cl.
*G01F 1/66* (2022.01)
*G01F 1/667* (2022.01)
(52) U.S. Cl.
CPC .............. *G01F 1/662* (2013.01); *G01F 1/667* (2013.01)
(58) Field of Classification Search
CPC .................................. G01F 1/662; G01F 1/667
See application file for complete search history.

(56) References Cited

U.S. PATENT DOCUMENTS

| | | | | |
|---|---|---|---|---|
| 4,929,368 A | * | 5/1990 | Baumoel | G01F 1/662 156/333 |
| 2016/0061778 A1 | * | 3/2016 | Kishiro | G01N 29/024 73/597 |

FOREIGN PATENT DOCUMENTS

| JP | 59152888 U | * | 3/1984 |
|---|---|---|---|
| JP | 59-152888 | | 10/1984 |

(Continued)

OTHER PUBLICATIONS

Translation of JP-59152888-U (provided by Applicant) (Year: 1984).*

*Primary Examiner* — Nathaniel T Woodward
(74) *Attorney, Agent, or Firm* — Millen, White, Zelano & Branigan, P.C.; Christopher W. Brody

(57) ABSTRACT

A flowmeter sensor can stably measure in a wide temperature range including one over 100° C. The flowmeter sensor includes an ultrasonic transducer, a pipe, and an acoustic prism. The acoustic prism has a bottom surface that is arranged in contact with the outer peripheral surface of the pipe and a front-side inclination surface that supports the ultrasonic transducer. The acoustic prism propagates ultrasonic waves from the ultrasonic transducer toward the fluid within the pipe. The pipe is made of a first heat-resistant resin having heat resistance in a temperature range of 90° C. to 200° C. and negative thermoacoustic characteristics in which the ultrasonic transmittance decreases as the temperature rises in such a temperature range. The acoustic prism is made of a second heat-resistant resin having heat resistance in the temperature range and positive thermoacoustic characteristics in which the ultrasonic transmittance increases as the temperature rises in such a temperature range.

10 Claims, 8 Drawing Sheets

(56) References Cited

FOREIGN PATENT DOCUMENTS

| | | |
|---|---|---|
| JP | 5927394 | 6/2016 |
| JP | 6789766 | 11/2020 |
| JP | 7074390 | 5/2022 |

* cited by examiner

FLOWMETER SENSOR

TECHNICAL FIELD

The present invention relates to a flowmeter sensor.

Conventionally, various ultrasonic flowmeters that measure the flow rate of liquids have been proposed as measurement devices that use ultrasonic waves. In this ultrasonic flowmeter, a flow rate measuring pipe is provided in the middle of a pipe through which liquid flows, and ultrasonic sensors are installed at upstream and downstream positions of the flow rate measuring pipe. Then, ultrasonic waves are transmitted and received using these ultrasonic sensors, and a liquid flow rate is calculated based on the time difference between the propagation time of the ultrasonic waves propagating from the upstream side to the downstream side and the propagation time of the ultrasonic waves propagating from the downstream side to the upstream side.

While various ultrasound flowmeters of this type have been proposed, there exists, for example, a clamp on type ultrasonic flowmeter sensor that can be attached to a straight-shaped pipe (as referenced in Patent Document 1).

As the above-described straight-type flowmeter sensor, there has conventionally been proposed one in which a pair of acoustic prisms supporting an ultrasonic transducer are arranged by being offset in the axial direction of a pipe (see, for example, Patent Document 2).

PRIOR ART DOCUMENTS

Patent Document

Patent Document 1: U.S. Pat. No. 5,927,394
Patent Document 2: U.S. Pat. No. 6,789,766

DISCLOSURE OF THE INVENTION

Problems to be Solved by the Invention

However, in the conventional technology, it was possible to perform stable measurements in a relatively low temperature range from normal temperature to about 100° C., but there was a problem in a high-temperature range exceeding 100° C., the sensitivity decreased significantly, and stable measurement was impossible.

The present invention has been made in view of the above problems, and an object thereof is to provide a flowmeter sensor capable of stably measuring flow velocity in a wide temperature range including a high-temperature range exceeding 100° C.

Means for Solving the Problem

Therefore, based on the prediction that the cause of the decrease in sensitivity in the flowmeter sensor at a high-temperature range exceeding 100° C. lies in the characteristics of the materials used in the sensor components, the inventors of the present invention conducted extensive research. As a result, the acoustic properties of the materials used for conventional general sensor components are temperature dependent, and most of such materials have the characteristics to decrease the ultrasonic transmittance as the temperature rises (that is, negative thermoacoustic characteristics). In particular, the inventors have newly found a characteristic that the ultrasonic wave transmittance decreases significantly in a high-temperature range exceeding 100° C. In addition, in observing the proportions of lengths that individual components occupy within the entire length of the ultrasonic propagation path, it was newly discovered that the greater the proportion of length a material occupies, the more significant the impact of its thermoacoustic characteristics on the overall characteristics of the sensor. After conducting trial and error based on these findings, the inventors of the present invention have finally conceived the following inventive aspects.

In order to solve the above problems, the first aspect of the present invention refers to a flowmeter sensor comprising an ultrasonic transducer that generates ultrasonic waves, a pipe through which a fluid flows, and an acoustic prism having a bottom surface that is arranged in contact with the outer peripheral surface of the pipe and a front side inclination face that supports the ultrasonic transducer, and propagates ultrasonic waves from the ultrasonic transducer toward the fluid in the pipe, wherein the pipe is made of a first heat resistant resin having heat resistance in a temperature range of 90° C. to 200° C. and a negative thermoacoustic characteristics in which the ultrasonic transmittance decreases as the temperature rises in such a temperature range, and the acoustic prism is made of a second heat-resistant resin having heat resistance in a temperature range of 90° C. to 200° C. and a positive thermoacoustic characteristics in which the ultrasonic transmittance increases as the temperature rises in such a temperature range.

As such, according to the first aspect of the invention, the second heat-resistant resin having positive thermoacoustic characteristics is used for the acoustic prism, which occupies a relatively large proportion of the total length of the ultrasonic wave propagation path. Therefore, even if the other member forming the ultrasonic wave propagation path is made of a material having negative thermoacoustic characteristics, the influence thereof is alleviated. As a result, it is possible to minimize the decrease in ultrasonic transmittance in a high temperature range exceeding 100° C. and to maintain suitable sensitivity even in such a high-temperature range. In addition, both the acoustic prism and the pipe are made of a resin material that has heat resistance in a high-temperature range of over 100° C., thus making it possible to perform measurement even when a high temperature fluid of over 100° C. is flowing.

The second aspect of the present invention refers to a flowmeter sensor according to the first aspect of the present invention, wherein an ultrasonic wave propagation path is formed by the pipe and the acoustic prism; thereof, the length occupied by the acoustic prism in the entire length of the ultrasonic wave propagation path is greater than that occupied by the pipe in the entire length of the ultrasonic wave propagation path.

According to the second aspect of the present invention, even if the pipe-forming material has negative thermoacoustic characteristics, by combining it with the acoustic prism made of the pipe-forming material having positive thermoacoustic characteristics, the effect of the negative thermoacoustic characteristics can be effectively mitigated.

The third aspect of the present invention refers to a flowmeter sensor according to the second aspect of the present invention, wherein the second heat-resistant resin is polyether sulfone, and the first heat-resistant resin is a fluororesin that has a higher heat resistance than the second heat resistant resin.

The fourth aspect of the present invention refers to a flowmeter sensor according to the first aspect of the present invention, wherein a coupling material layer is further provided in contact with the outer peripheral surface of the pipe and the bottom surface of the acoustic prism, and the coupling material layer is made of a heat resistant material having a heat resistance in the temperature range of 90° C. to 200° C.

Therefore, according to the fourth aspect of the present invention, by arranging the pipe and the acoustic prism via the coupling material layer, the adhesion between the pipe and the acoustic prism is improved, and the ultrasonic waves are efficiently propagated, thus making it possible to accurately measure the flow velocity.

The fifth aspect of the present invention refers to a flowmeter sensor according to the fourth aspect of the present invention, wherein the heat-resistant material has negative thermoacoustic characteristics in which the ultrasonic wave transmittance decreases as the temperature rises in the temperature range of 90° C. to 200° C.

The sixth aspect of the present invention refers to a flowmeter sensor according to the fifth aspect of the present invention, wherein an ultrasonic wave propagation path is formed by the pipe, the coupling material layer, and the acoustic prism, thereof the length occupied by the acoustic prism over the entire length of the ultrasonic wave propagation path is greater than the sum of the length occupied by the pipe and the length occupied by the coupling material layer in the entire length of the ultrasonic propagation path.

Therefore, according to the sixth aspect of the present invention, even if the forming material of the pipe and of the coupling material layer has negative thermoacoustic characteristics, such a forming material is combined with the acoustic prism made of the forming material having positive thermoacoustic characteristics, thus making it possible to mitigate the influence of negative thermoacoustic characteristics effectively.

The seventh aspect of the present invention refers to a flowmeter sensor according to the sixth aspect of the present invention, wherein the second heat-resistant resin is polyether sulfone, and the first heat-resistant resin is a fluororesin having a higher heat resistance than the second heat-resistant resin, and the heat resistant material is a fluororubber having a higher heat resistance than the second heat-resistant resin.

The eighth aspect of the present invention refers to a flowmeter sensor according to any one of the first to the seventh aspects of the present invention, wherein an intermediate portion connecting the front-side inclination face and the bottom surface of the acoustic prism has a hollow portion formed on both sides.

Therefore, according to the eighth aspect of the present invention, since the width of the intermediate portion is narrowed, the area of the lower end of the intermediate portion that contacts the pipe is reduced. As a result, the lower surface of the acoustic prism comes into contact with the pipe under high contact pressure, and the ultrasonic waves emitted by the ultrasonic transducer can be efficiently and reliably incident on the pipe side. In addition, among the ultrasonic waves emitted by the ultrasonic transducer, the ultrasonic waves that do not enter the piping side are reflected by the lower surface of the acoustic prism and become reverberation, which causes noise. In this regard, with this configuration, the lower surface of the acoustic prism is less likely to be a reflecting surface, so reverberation caused by reflection from the lower surface can be reduced. Furthermore, the amount of resin material used for forming the acoustic prism can be reduced, thus making it easier to reduce the manufacturing cost.

The ninth aspect of the present invention refers to a flowmeter sensor according to any one of the first to the seventh aspects of the present invention, wherein an intermediate portion connecting the front-side inclination face and the bottom surface in the acoustic prism has a width that becomes narrower toward the bottom surface side.

Therefore, according to the ninth aspect of the present invention, since the width of the intermediate portion is narrowed, the area of the lower end of the intermediate portion that contacts the pipe is reduced. As a result, the lower surface of the acoustic prism comes into contact with the pipe under high contact pressure, and the ultrasonic waves emitted by the ultrasonic transducer can be efficiently and reliably incident on the pipe side. In addition, among the ultrasonic waves emitted by the ultrasonic transducer, the ultrasonic waves that do not enter the piping side are reflected by the lower surface of the acoustic prism and become reverberation, which causes noise. In this regard, with this configuration, the lower surface of the acoustic prism is less likely to be a reflecting surface, so reverberation caused by reflection from the lower surface can be reduced. Furthermore, the amount of resin material used for forming the acoustic prism can be reduced, thus making it easier to reduce the manufacturing cost.

The tenth aspect of the present invention refers to a flowmeter sensor according to any one of the first to the seventh aspects of the present invention, wherein the ultrasonic transducer is made of a porous body of alkali niobate-based piezoelectric ceramics.

According to the tenth aspect of the present invention, since the porous body is a ceramic having a Curie temperature of 300° C. or higher, the characteristics do not deteriorate even at 200° C. Therefore, using an ultrasonic transducer made of this material makes it possible to obtain a flowmeter sensor capable of measuring a high-temperature fluid of over 100° C. and performing an accurate measurement even in such a case.

Effects of the Invention

As detailed above, according to the first to the tenth aspects of the present invention, it is possible to provide a flowmeter sensor capable of stably measuring the flow velocity in a wide temperature range including a high-temperature range exceeding 100° C.

MODES FOR CARRYING OUT THE INVENTION

Figure 1:
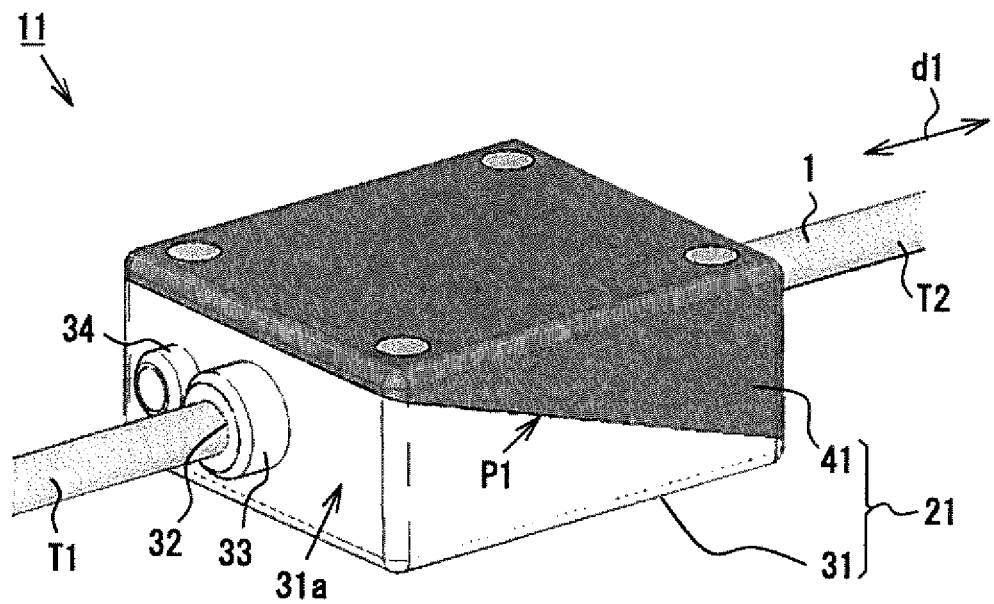
FIG. 1 is a perspective view showing a straight-type flowmeter sensor according to an embodiment embodying the present invention.
Figure 2:
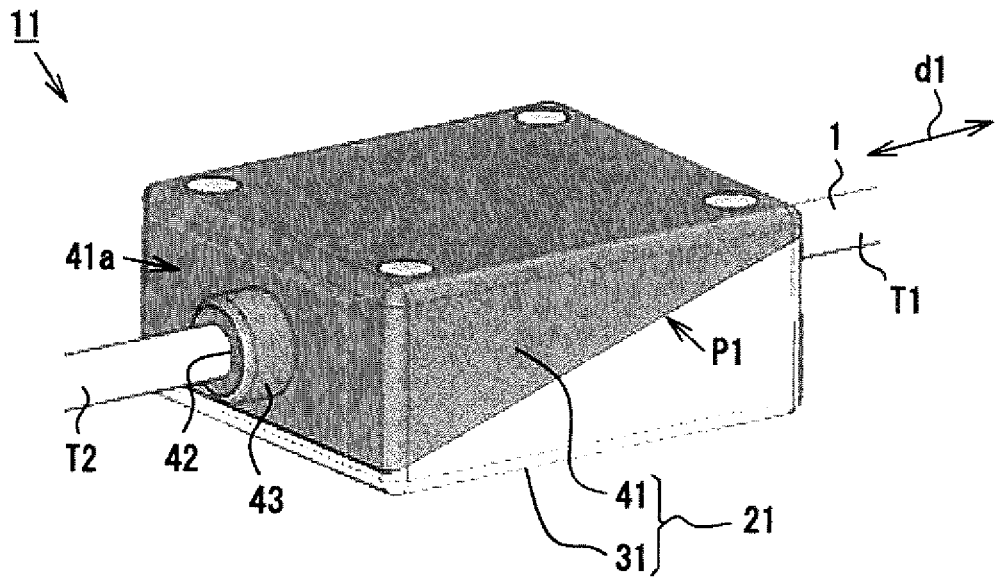
FIG. 2 is a perspective view of the straight type flowmeter sensor of the first embodiment viewed from another angle.

A straight type flowmeter sensor 11 according to embodiments of the present invention will be described in detail below with reference to FIG. 1 to FIG. 8.

As shown in FIG. 1 to FIG. 7 and the like, the straight-type flowmeter sensor 11 of this embodiment includes a pipe 1, an inner case 22, an outer case 21, an ultrasonic transducer 64, an acoustic prism 61, a coupling material layer 81, etc.

The pipe 1 is a resin tube member having a circular cross-section, and at least a part thereof has a straight portion. Inside the pipe 1, a fluid of which the flow rate is to be measured flows, and in this embodiment, a high-temperature liquid of 100° C. or higher flows. A sheet-like coupling material layer 81 is arranged on the outer peripheral surface of the pipe 1 at the position where the prism is installed.

The pair of acoustic prisms 61 is a member that supports an ultrasonic transducer 64 capable of transmitting and receiving ultrasonic waves and is also a member that propagates ultrasonic waves from the ultrasonic transducer 64 toward the fluid in the pipe 1. (See FIG. 5 to FIG. 7, etc.). The pair of acoustic prisms 61 are arranged on the outer peripheral surface of the pipe 1 to substantially face each other and configure the permeable straight-type flowmeter sensor 11. In addition, the pair of acoustic prisms 61 is arranged to support an ultrasonic transducer 64 in a state in which ultrasonic waves can be obliquely incident on the straight pipe 1 through which fluid flows and is offset in the axial direction d1 of the pipe 1.

Figure 5:
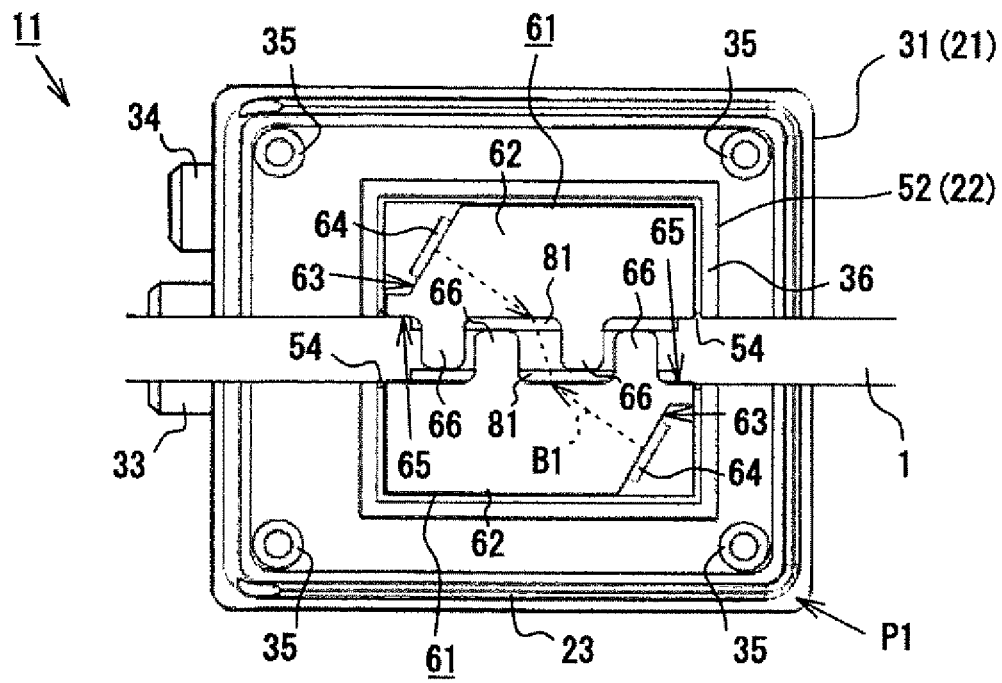
FIG. 5 is a plan view showing members below a pair of acoustic prisms as shown in FIG. 4.
Figure 6:
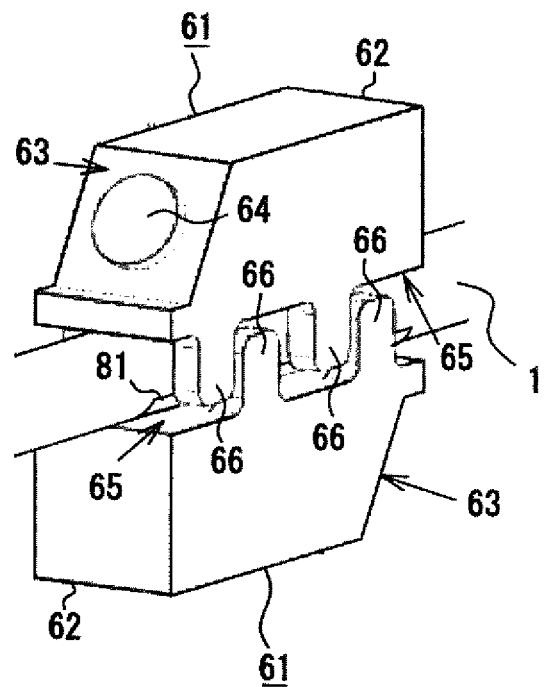
FIG. 6 is a perspective view for explaining an arrangement state of a pair of acoustic prisms.
Figure 7:
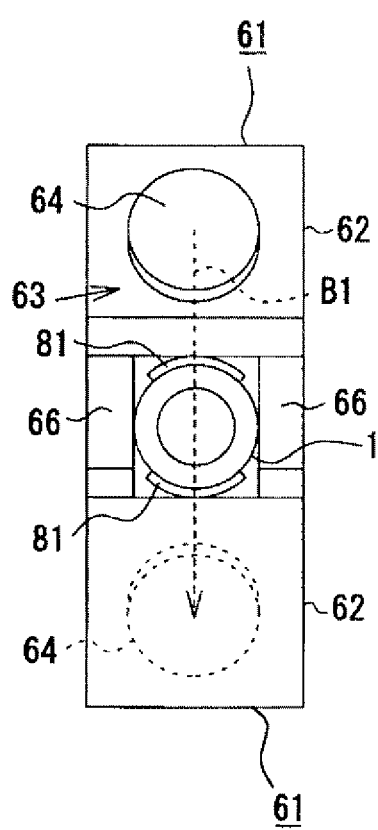
FIG. 7 (*a*) and FIG. 7 (*b*) are side views for explaining the arrangement state of a pair of acoustic prisms.
Figure 7:
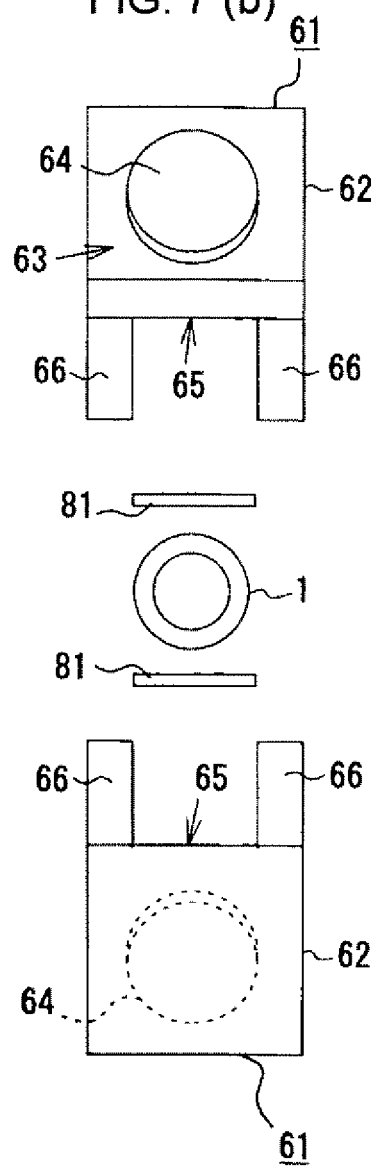

As shown in FIG. 5 to FIG. 7 and the like, the pair of acoustic prisms 61 in this embodiment have the same size and shape. Specifically, these acoustic prisms 61 have a block shape elongated in the front rear direction (left-right direction as shown in FIG. 5) and are formed using, for example, a resin material that can efficiently transmit ultrasonic waves. A front-side inclination face 63 is formed on the front side of the acoustic prism 61 at a predetermined angle (approximately 60 degrees in this embodiment) with respect to the bottom surface 65. A disk-shaped ultrasonic transducer 64 made of a ceramic sintered body is adhered and supported on the front-side inclination face 63. In this embodiment, for example, the ultrasonic transducer 64 that generates ultrasonic waves of 2 MHz is used, but it is of course possible to generate ultrasonic waves of other frequencies. As the ceramic sintered body constituting the ultrasonic transducer 64 of a piezoelectric element, a porous sintered body of alkali niobate piezoelectric ceramics such as potassium sodium niobate is selected. Of course, it may also be a ceramic sintered body other than the above. The ultrasonic radiation surfaces of these ultrasonic transducers 64 are arranged in a tilted manner in the direction of the straight pipe 1.

A plurality of legs 66 are integrally protruded from a bottom surface 65 (that is, a surface facing the pipe 1 side) of a prism body 62 constituting these acoustic prisms 61. Although the bottom surface 65 in this embodiment is flat, it may be concavely curved so as to correspond to the shape of the outer peripheral surface of the pipe 1. These legs 66 extend in the same direction and hold and fix the pipe 1 from both sides. In this embodiment, there are two pairs of legs 66 on the left and right sides, that is, a total of four legs, each of which has the same shape and size. The number of legs 66 is not limited to four and may be three or less or five or more. Each leg 66 is formed to have a dimension slightly shorter than the diameter of the pipe 1. The pair of legs 66 on the front side and the pair of legs 66 on the rear side are arranged with an interval larger than the width of the legs 66. The reason is that the legs 66 belonging to one acoustic prism 61 are arranged in the area between the legs 66 belonging to the other acoustic prism 61 with sufficient dimensions.

The pair of acoustic prisms 61 are arranged with their legs 66 alternately shifted in the axial direction d1 of the pipe 1, so that such legs do not come into contact with other legs 66 of different acoustic prisms 61 (that is, the counterpart acoustic prism 61). The reason for avoiding such contacts among the legs 66 is to prevent the oscillation of the ultrasonic waves emitted by the ultrasonic transducer 64 belonging to one acoustic prism 61 from being directly transmitted to the other. Also, the plurality of legs 66 are arranged so as to avoid the center of the ultrasonic beam B1 emitted from the ultrasonic transducer 64. The reason for this is to reduce the loss of ultrasonic oscillation due to transmission of the ultrasonic beam B1 to the legs 66 and to avoid deterioration in measurement accuracy and sensitivity.

Figure 3:
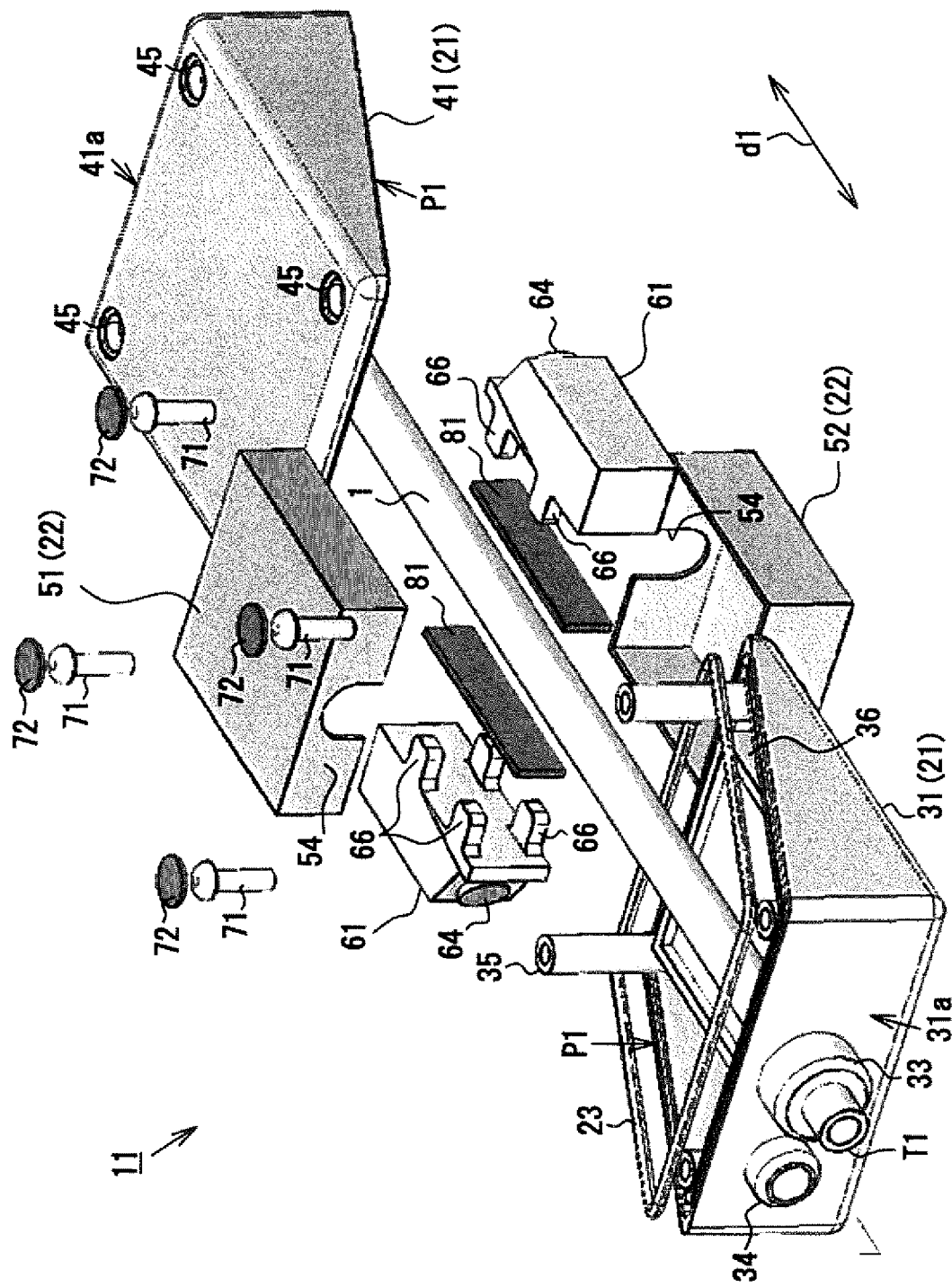
FIG. 3 is an exploded perspective view showing the straight-type flowmeter sensor according to the first embodiment.
Figure 4:
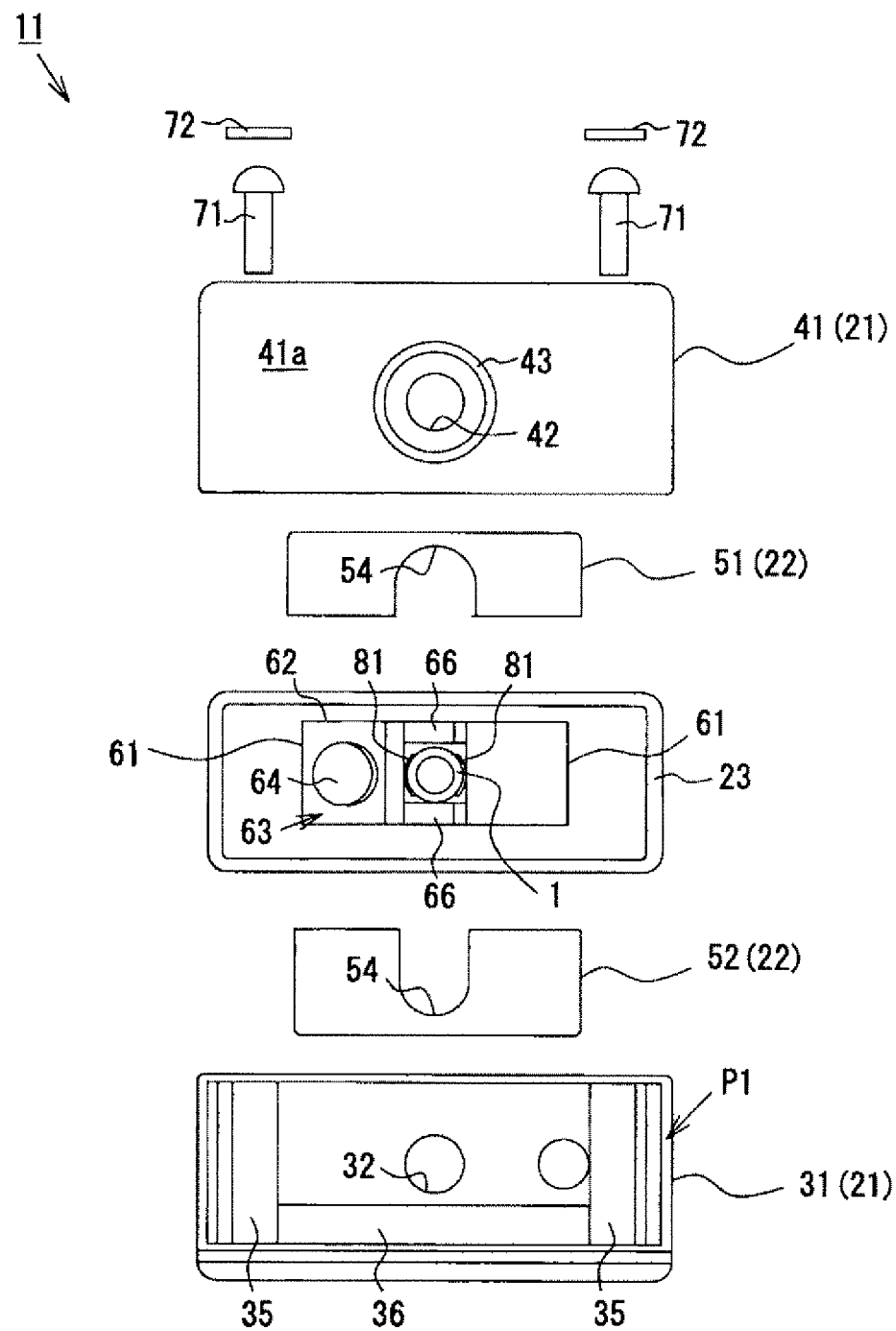
FIG. 4 is an exploded side view showing the straight-type flowmeter sensor according to the first embodiment.

As shown in FIG. 3 to FIG. 5, the inner case 22 is a rectangular box-shaped container that accommodates a pair of acoustic prisms 61 inside itself to hold and fix them in the correct position with respect to the pipe 1. Also, the inner case 22 may serve as an electromagnetic shield that protects the ultrasonic transducer 64 housed therein from the influence of magnetism. The material for forming the inner case 22 is not particularly limited, and for example, PPS, fluororesin, or the like can be used. However, when imparting a function as an electromagnetic shield, it is preferable to use a metal material having magnetic shielding properties. The inner case 22 is composed of an upper lid member 51 and a lower lid member 52. Approximately U-shaped notch portions 54 are formed in the center of both end surfaces of the upper lid member 51 and the center of both end surfaces of the lower lid member 52, respectively. When the upper lid member 51 is covered with the lower lid member 52, these notches 54 form a circular pipe insertion hole.

In the inner space of the inner case 22, the pair of acoustic prisms 61 are housed in a state where pipe 1 is held and fixed from both sides. In this state, the coupling material layer 81 is interposed between the outer peripheral surface of the pipe 1 and the bottom surface 65 of the acoustic prism 61 and is arranged in contact with them. All of the surfaces of the acoustic prism 61 except for the bottom surface 65 are substantially in contact with the inner wall surface of the inner case 22. In addition, the inner case 22 has fastening members such as set screws or the like (not shown). By tightening the set screws, the pair of acoustic prisms 61 are held and fixed to the inner case 22 and the pipe 1 so as not to be displaced. In other words, according to this embodiment, one sensor module is configured in the middle of the pipe 1 with the pair of acoustic prisms 61 having the ultrasonic transducers 64, the coupling material layer 81, and the inner case 22. The upper surface of the acoustic prism 61 is pressed by tightening the set screws, thus making it possible to increase the contact pressure of the acoustic prism 61 against the pipe 1.

As shown in FIG. 1 to FIG. 5, the outer case 21 is a rectangular box-shaped container slightly larger than the inner case 22 and serves to house and protect the inner case 22, which is the sensor module, and the like. Although the material for forming the outer case 21 is not particularly limited, for example, PPS, fluororesin, or the like is used. The outer case 21 is composed of a lower case divided piece 31 (first-case divided piece) and an upper-case divided piece 41 (second-case divided piece).

The lower case divided piece 31 has an opening on the upper surface side overall and the edge of the opening constitutes the divided surface P1 of the outer case 21. The lower case divided piece 31 has a first side wall portion 31a only on one side. A pipe insertion portion 33 having a first insertion hole 32 protrudes from the central portion of the outer surface of the first side wall portion 31a. A first end portion T1 of the pipe 1 is inserted through the first insertion hole 32. A connector portion 34 for cable connection is provided beside the pipe insertion portion 33 on the outer surface of the first side wall portion 31a. As shown in FIG. 3 and the like, a rectangular frame-shaped wall portion 36 is provided in the center of the inner bottom surface of the lower-case divided piece 31. By fitting the inner case 22 into the recess formed by the wall portion 36, the inner case 22 is positioned and fixed to the lower case divided piece 31. At the four corners of the inner bottom surface of the lower-case divided piece 31, columnar bosses 35 are protruded to be used for fixing the upper-case divided piece 41 with screws. A female thread is formed in each boss 35.

On the other hand, the upper-case divided piece 41 has an opening on the lower surface side overall, and the edge of the opening constitutes the divided surface P1 of the outer case 21. The upper case divided piece 41 has a second side wall portion 41a only on one side. The second side wall portion 41a is positioned to face the first side wall portion 31a of the outer case 21. A pipe insertion portion 43 having a second insertion hole 42 protrudes from the center of the outer surface of the second side wall portion 41a. A second end portion T2 of the pipe 1 is inserted through the second insertion hole 42. The upper case divided piece 41 differs from the lower case divided piece 31 in that it does not include the connector portion 34, the boss portion 35, and the wall portion 36. Screw insertion portions 45 are formed at the four corners of the bottom surface of the upper case divided piece 41 to face the boss portions 35 of the lower case divided piece 31, respectively. A screw 71 is inserted through each of the screw insertion portions 45, and a screw cap 72 for hiding the screw 71 is provided.

A waterproof packing 23 is attached to the interface when the lower case divided piece 31 and the upper case divided piece 41 are joined together at the divided surfaces P1. The waterproof packing 23 of this embodiment has a rectangular shape similar to the shape of the opening edge and is formed using a fluororesin such as FPM or the like. The waterproof packing 23 is compressed by tightening the screw 71 from the vertical direction while being arranged between the lower case divided piece 31 and the upper case divided piece 41. As a result, no clearance is formed at the interface between the lower-case divided piece 31 and the upper case divided piece 41. As such, the sealing property is improved, thus making it possible to waterproof the outer case 21.

Next, materials for forming the pipe 1, the acoustic prism 61, and the coupling material layer 81 that constitute the straight-type flowmeter sensor 11 of this embodiment will be described.

In this embodiment, the pipe 1 is a tubular member with an outer diameter of several millimeters and a wall thickness of about 1 mm, made of the first heat resistant resin. The first heat resistant resin has heat resistance in a temperature range of 90° C. to 200° C. The above phrase " . . . has heat resistance in a temperature range of 90° C. to 200° C." is defined as having a glass transition point Tg of 200° C. or higher when the first heat resistant resin is an amorphous resin, for example. When the first heat resistant resin is a crystalline resin, it is defined as having both a glass transition point Tg and a melting point of 200° C. or higher. That is, the first heat resistant resin does not soften in such a temperature range and maintains stable physical properties. Separately from this, the above phrase " . . . has heat resistance in a temperature range of 90° C. to 200° C." may also be defined as having a continuous use temperature of 200° C. or higher in a no-load state. In addition, the first heat-resistant resin has negative thermoacoustic characteristics in which the transmittance of ultrasonic waves decreases (that is, the propagation attenuation increases) as the temperature rises in such a temperature range. Since the first heat-resistant resin is used for parts that come into direct contact with the fluid to be measured, it is preferable to include chemical resistance that does not deteriorate or corrode even when exposed to high-temperature, strong acid, or strong alkaline liquids.

The coupling material layer 81 of this embodiment is a rectangular sheet material having a thickness of about 0.5 mm to 1 mm and is made of a heat-resistant material having heat resistance in a temperature range of 90° C. to 200° C. The above phrase " . . . has heat resistance in a temperature range of 90° C. to 200° C." is defined such that the heat resistant material is rubber, for example, and that when the tensile strength is measured after aging for 24 hours, the temperature observed as the measured value decreases is above 200° C. Like the first heat-resistant resin, this heat resistant material has negative thermoacoustic characteristics in which the transmittance of ultrasonic waves decreases as the temperature rises in such a temperature range. In addition, it is preferable that the coupling material layer 81 has suitable elasticity for closely contacting the outer peripheral surface of the pipe 1 and the bottom surface 65 of the acoustic prism 61.

The acoustic prism 61 of this embodiment is made of a second heat resistant resin different from the first heat-resistant resin and the heat resistant material described above. The second heat-resistant resin has heat resistance in the temperature range of 90° C. to 200° C. "Having heat resistance in the temperature range" is defined as having a glass transition point Tg of 200° C. or higher when the second heat-resistant resin is an amorphous resin, for example. When the second heat-resistant resin is a crystalline resin, it is defined as having both a glass transition point Tg and a melting point Tm of 200° C. or higher. However, the heat resistance required for the second heat-resistant resin may not be as high as the heat resistance required for the first heat-resistant resin. Unlike the first heat-resistant resin and the heat-resistant material, the second heat-resistant resin has positive thermoacoustic characteristics of which ultrasonic transmittance increases (that is, propagation attenuation decreases) as the temperature rises in such a temperature range. That is, the second heat-resistant resin and the first heat-resistant resin or heat-resistant material have thermoacoustic characteristics opposite to each other.

In this embodiment, as the first heat resistant resin that is the material for forming the pipe 1, a fluororesin having a higher heat resistance than the second heat-resistant resin is selected. Specifically, PFA (perfluoroalkoxy alkanes) is selected. As the heat-resistant material for forming the coupling material layer 81, fluororubber having higher heat resistance than the second heat-resistant resin is selected. Specifically, FKM (propylene hexafluoride-vinylidene fluoride copolymer) is selected. PES (polyether sulfone) is selected as the second heat resistant resin that is the material for forming the acoustic prism 61.

As shown in FIG. 5, according to this straight-type flowmeter sensor 11, an ultrasonic propagation path is formed by the pipe 1, the acoustic prism 61 and the coupling material layer 81. The acoustic prism 61 has a front side inclination face 63 for making ultrasonic waves obliquely enter the fluid in the pipe 1. The incident angle increases as the tilt angle of the front side inclination face 63 of the acoustic prism 61 increases. In this case, the propagation time difference used to calculate the flow velocity and flow rate is increased, which is advantageous for improving the measurement accuracy. On the other hand, the greater the tilt angle, the longer the propagation distance within the acoustic prism 61, thus quickly receiving the influence of the attenuation characteristics. Given such circumstances, the angle of the front-side inclination face 63 of the acoustic prism 61 is preferably 30 degrees to 70 degrees, more preferably 45 degrees to 60 degrees. With such an inclination angle, the proportion of the length occupied by the acoustic prism 61 to the total length of the ultrasonic wave propagation path becomes as large as 70 to 99%.

Figure 8:
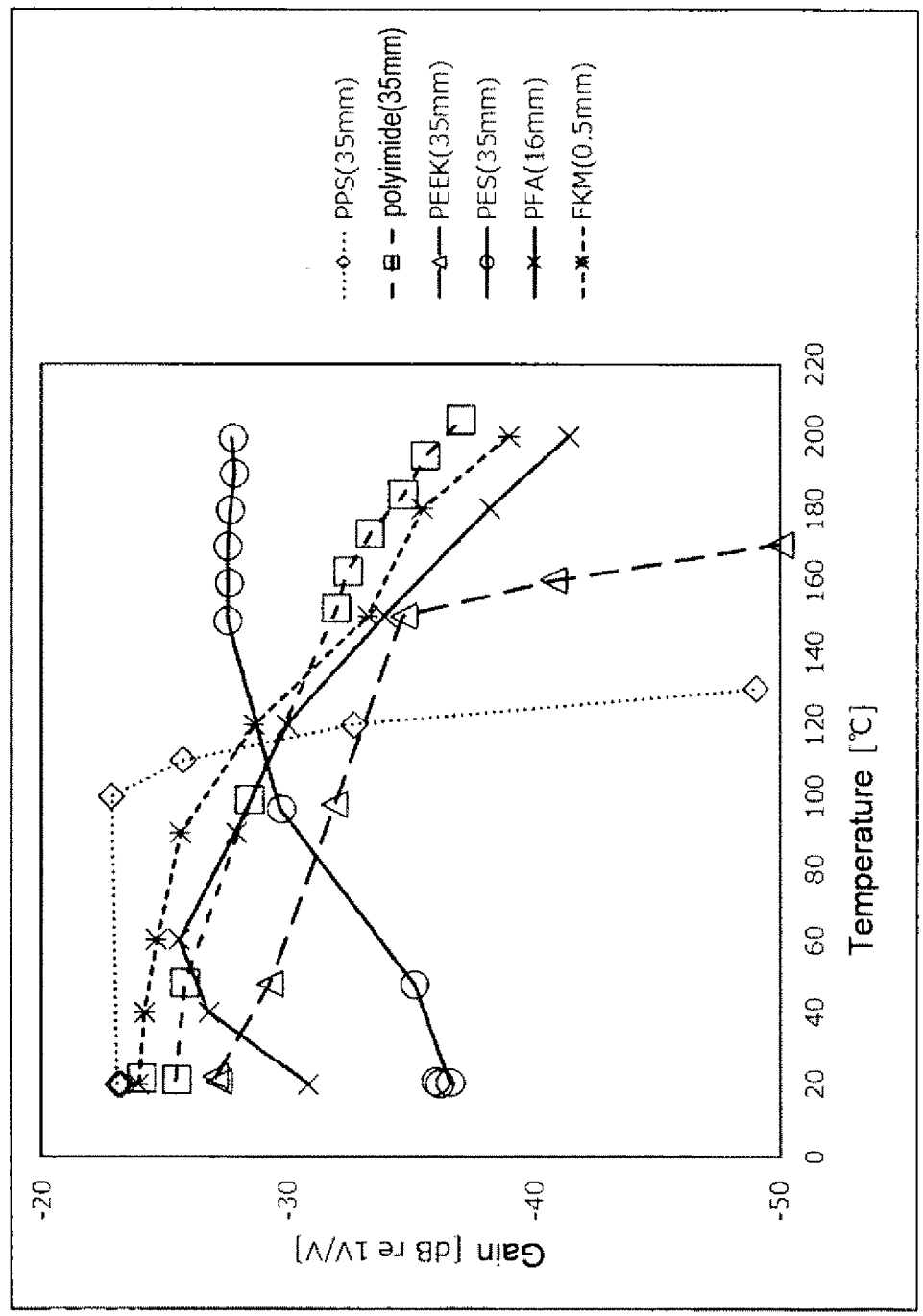
FIG. 8 is a graph comparing the relationship between temperature and transmission/reception gain for each resin material.

FIG. 8 is the graph showing the test results comparing the thermoacoustic characteristics of multiple resin materials. Here, test pieces were prepared for each of a plurality of types of resin materials, and ultrasonic transducers having a resonance frequency of 2 MHz were attached to both end surfaces of the test pieces, thus transmitting and receiving ultrasonic waves by impulse driving. Then, the transmission/reception gain (dB re 1V/V) of the ultrasonic wave transmitted through the test piece was investigated in a predetermined temperature range (20° C. to 200° C.). PPS, PI, PEEK, PES, PFA, and FKM were selected as resin materials.

As shown in the graph of FIG. 8, for PPS, the transmission/reception gain showed a substantially constant maximum value in the temperature range of 20° C. to 100° C. However, when the temperature exceeded 100° C., the transmission/reception gain dropped sharply. Regarding PI, the transmission/reception gain showed the maximum value at 20° C. but gradually decreased as the temperature increased. For PEEK, the transmission/reception gain showed the maximum value at 20° C. Still, it gradually decreased as the temperature increased, and when exceeding the temperature around 150° C., the transmission/reception gain dropped sharply. Regarding FKM, the transmission/reception gain showed the maximum value at 20° C. but gradually decreased as the temperature increased. That is, in the graph of FIG. 8, the curves showing PPS, PI, PEEK, and FKM can all be said to be "generally downward sloping curves" in the normal temperature range of 20° C. to 200° C. As for PFA, the transmission/reception gain showed the maximum value at 60° C. but gradually decreased as the temperature increased. That is, in the graph of FIG. 8, the curve showing PFA has a slightly upward sloping portion in a relatively low-temperature range. Still, in the temperature range of 20° C. to 200° C., which is normal temperature, it could be called a "generally downward-sloping curve." In other words, it was concluded that PPS, PI, PEEK, PFA, and FKM have "negative thermoacoustic characteristics" in which the ultrasonic transmission decreases with increasing temperature, at least in the temperature range of 90° C. to 200° C.

On the other hand, PES has a low transmission/reception gain at 20° C., which is much lower than PPS, PI, and PEEK. However, the transmission/reception gain gradually increases as the temperature rises. When it reaches about 120° C., the transmission/reception gain exceeds PPS, PI, PEEK, PFA, and FKM, showing the maximum value between 150° C. and 200° C. That is, in the graph of FIG. 8, the curve showing the PES can be called "a generally upward-sloping curve" in the normal temperature range of 20° C. to 200° C. In other words, it was concluded that, unlike PPS, PI, PEEK, PFA, and FKM, PES has a "positive thermoacoustic characteristics" in which the ultrasonic transmittance increases as the temperature rises at least in the temperature range of 90° C. to 200° C.

Therefore, according to this embodiment, the following effects can be obtained.

(1) According to the straight flowmeter sensor 11 of this embodiment, the pipe 1, the acoustic prism 61, and the coupling material layer 81 configure an ultrasonic wave propagation path from one ultrasonic transducer 64 to the other ultrasonic transducer 64. Then, the pipe 1 is made of a first heat-resistant resin (PFA) having heat resistance in a temperature range of 90° C. to 200° C. and negative thermoacoustic characteristics in which the ultrasonic transmittance decreases as the temperature rises in such a temperature range. The acoustic prism 61 is made of a second heat-resistant resin (PES) having heat resistance in the temperature range of 90° C. to 200° C. and positive thermoacoustic characteristics in which the ultrasonic transmittance increases as the temperature rises in such a temperature range. The coupling material layer 81 is made of a heat-resistant material (FKM) having heat resistance in the temperature range of 90° C. to 200° C. and negative thermoacoustic characteristics in which the ultrasonic transmittance decreases as the temperature rises in such a temperature range.

According to this embodiment, the second heat-resistant resin having positive thermoacoustic characteristics is used for the acoustic prism 61, which occupies a relatively large proportion of the total length of the ultrasonic wave propagation path. Therefore, even if the other members (i.e., the pipe 1 and the coupling material layer 81) forming the ultrasonic wave propagation path have negative thermoacoustic characteristics, the influence thereof is reduced. Therefore, it is possible to minimize the decrease in ultrasonic transmittance in a high-temperature range exceeding 100° C. and to maintain a suitable sensitivity even in such a temperature range. In addition, since the acoustic prism 61, the pipe 1, and the coupling material layer 81 all use materials having heat resistance in a high-temperature range of over 100° C., measurements can be done even when a high-temperature fluid of over 100° C. flows. As described above, according to this embodiment, it is possible to provide the straight type flowmeter sensor 11 that can stably measure the flow velocity in a wide temperature range including a high-temperature range of over 100° C.

(2) According to this embodiment, the pipe 1 and the acoustic prism 61 are arranged via an elastic coupling material layer 81. Therefore, the adhesion between the pipe 1 and the acoustic prism 61 is improved, and ultrasonic waves can be efficiently propagated, thus making it possible to measure flow velocity accurately.

(3) According to this embodiment, the straight-type flowmeter sensor 11 is configured using an ultrasonic transducer 64 made of a porous body of alkaline niobate piezoelectric ceramics. Since the porous body is a ceramic having a Curie temperature of 300° C. or higher, the properties do not deteriorate even at 200° C. Therefore, using the ultrasonic transducer 64 made of this material, the flowmeter sensor 11 that can measure a high-temperature fluid at over 100° C. and perform accurate measurements even in such a case can be obtained.

Also, each of the above embodiments may be modified as follows.

In each of the embodiments described above, PTFE is selected as the first heat resistant resin that is the material for forming the pipe 1. However, the material is not limited to this. For example, PTFE (polytetrafluoroethylene), FEP (perfluoroethylene propene copolymer), or the like may be selected as another fluororesin having higher heat resistance than the second heat-resistant resin.

According to each embodiment described above, FKM, a vinylidene fluoride-based fluororubber, is selected as the heat-resistant material for forming the coupling material layer 81. However, the material is not limited to this. For example, fluororubber such as tetrafluoroethylene-propylene system (FEPM) and tetrafluoroethylene-purple vinyl ether system (FFKM) or the like may be selected. As a material for forming the coupling material layer 81, a rubber material other than the fluororubber may be used, or a material other than the rubber material (liquid such as oil, grease, or adhesive) may also be used.

According to each of the embodiments described above, PES is selected as the second heat resistant resin that is the material for forming the acoustic prism 61. However, it is not limited to this. For example, PEF-GF30, which is obtained by adding glass fiber to PES, may also be selected.

Figure 9:
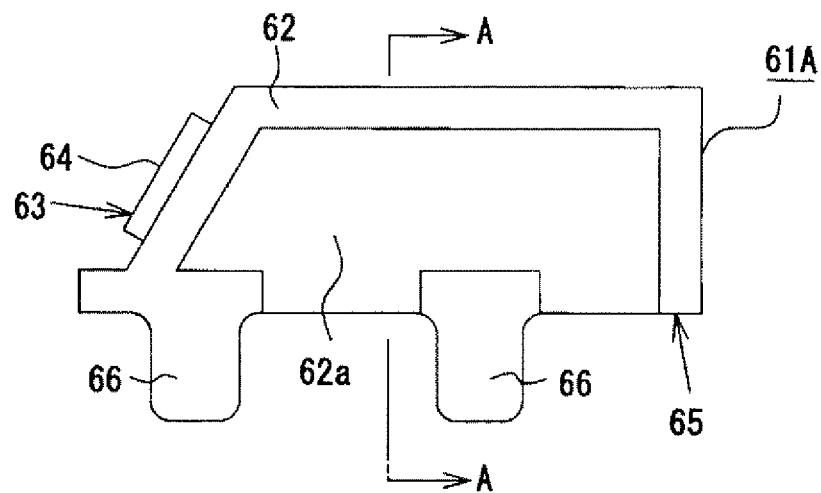
FIG. 9 (*a*) is a side view of the acoustic prism in the straight-type flowmeter sensor according to another embodiment, FIG. 9 (b) is a front view thereof, and FIG. 9 (c) is a cross-sectional view taken along the line A-A of FIG. 9 (a).
Figure 9:
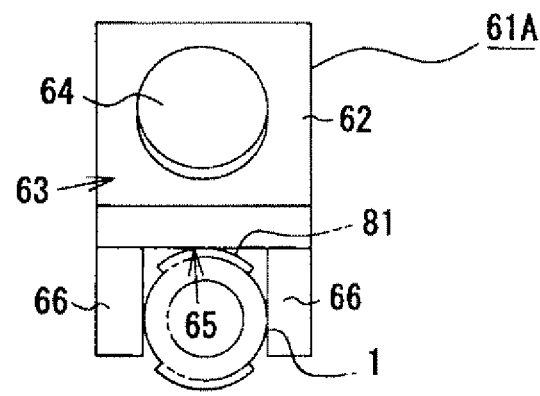
Figure 9:
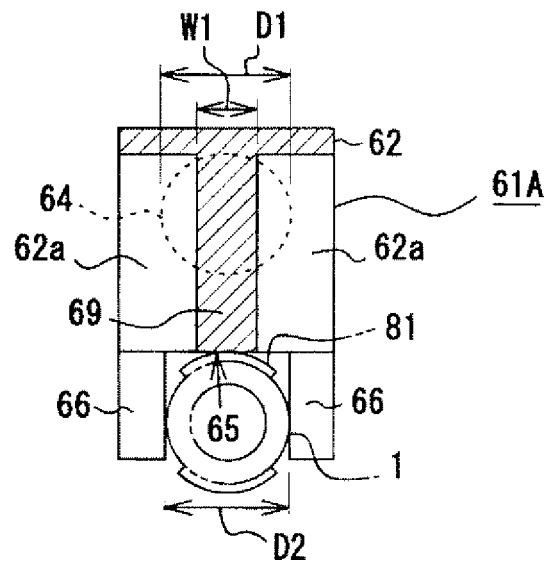

According to each of the above-described embodiments, the intermediate portion 69 connecting the front side inclination face 63 and the bottom surface 65 of the acoustic prism 61 is formed to have the same width in the horizontal direction, but it is not limited to this. For example, like the acoustic prism 61A of the straight-type flowmeter sensor 11 of another embodiment, as shown in FIG. 9, a hollow portion 62a may be formed on both side surfaces of an intermediate portion 69 connecting the front-side inclination face 63 and the bottom surface 65. In this case, the width W1 of the portion left after the hollow portion is preferably set to be smaller than the diameter D1 of the ultrasonic transducer 64 and smaller than the diameter D2 of the pipe 1 (preferably about 20% to 50% of D2). According to this configuration, the area of the lower end of the intermediate portion 69 in contact with the pipe 1 is reduced so that the lower surface of the acoustic prism 61A comes into contact with the pipe 1 under high contact pressure. Therefore, the ultrasonic waves emitted by the ultrasonic transducer 64 can be efficiently and reliably incident on the pipe 1 side.

Figure 10:
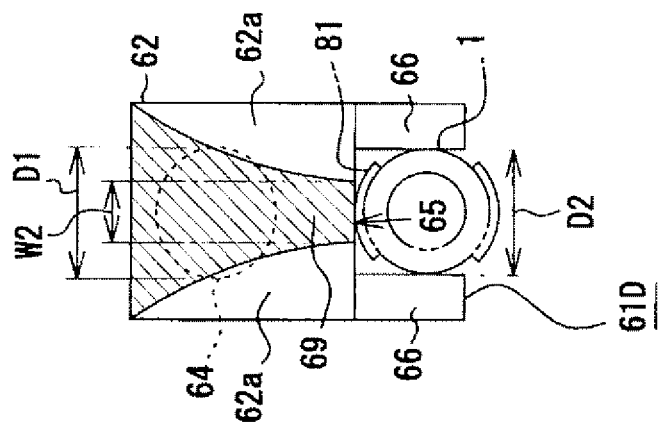
FIG. 10 (a) to FIG. 10 (c) are cross-sectional views of the acoustic prism according to another embodiment.
Figure 10:
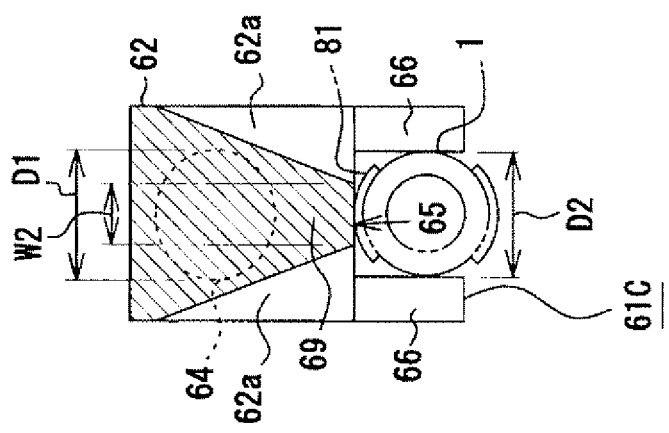
Figure 10:
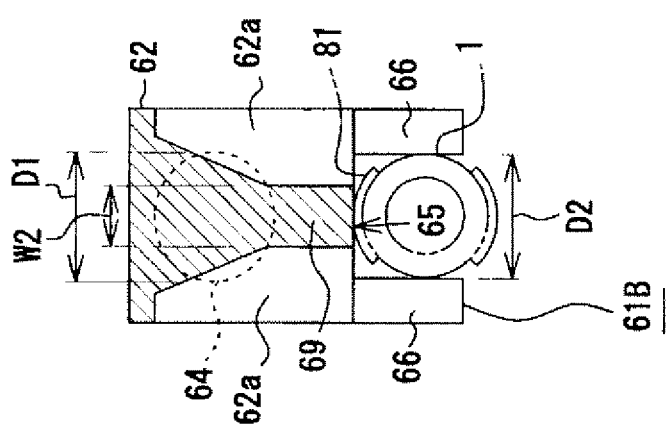

For example, like the acoustic prisms 61B, 61C, and 61D of another embodiment, as shown in FIG. 10(*a*) to FIG. 10(*c*), the intermediate portion 69 connecting the front-face inclination face 63 and the bottom surface 65 may be formed so that the width becomes narrower toward the bottom surface 65 side. In this case, the minimum width W2 of the intermediate portion 69 is preferably set to be smaller than the diameter D1 of the ultrasonic transducer 64 and smaller than the diameter D2 of the pipe 1 (preferably about 20% to 50% of D2). With these configurations, the area of the lower end of the intermediate portion 69 that contacts the pipe 1 is reduced so that the lower surfaces of the acoustic prisms 61B to 61D come into contact with the pipe 1 under high contact pressure. Therefore, as in the case of FIG. 9, the ultrasonic waves emitted by the ultrasonic transducer 64 can be efficiently and reliably incident on the pipe 1 side.

According to each of the above-described embodiments, a plurality of legs 66 for holding and fixing the pipe 1 from both sides protrudes from the bottom surface 65 of the prism body 62 that constitutes the acoustic prism 61. However, these legs may be omitted. However, in the case where the structures as shown in FIG. 9(*a*) to FIG. 9(*c*) and FIG. 10(*a*) to FIG. 10(*c*) are adopted, a plurality of legs 66 should be protruded to hold and fix the lower end of the intermediate portion 69, which has a small area, must be brought into contact with the pipe 1 side.

According to each of the above-described embodiments, the substantially trapezoidal acoustic prism 61 in a side view is used. However, it is not limited to this. For example, an acoustic prism having a substantially triangular shape in a side view may also be used.

According to each of the above-described embodiments, the present invention is embodied in the straight-type flowmeter sensor 11. Still, it may also be embodied in a non-straight-type flowmeter sensor.

According to each of the above-described embodiments, the ultrasonic transducer 64 made of potassium sodium niobate-based (alkali niobate-based) porous sintered body is used. However, it is not particularly limited to this. It is also possible to use the ultrasonic transducer 64 made of ceramic sintered body of, for example, lead zirconate titanate (PZT), barium titanate, PMN-PT (Pb (Mg$_{1/3}$Nb$_{2/3}$) O$_3$—PbTiO$_3$) single crystal, PZNT (Pb (Zn$_{1/3}$Nb$_{2/3}$) O$_3$—PbTiO$_3$) single crystal, or LiNbO$_3$ single crystal.

Besides the technical ideas of the present invention, as described above, other technical ideas to be understood are described hereinafter.

(1) A flowmeter sensor comprising an ultrasonic transducer that generates ultrasonic waves, a pipe through which a fluid flows, and an acoustic prism having a bottom surface that is arranged in contact with the outer peripheral surface of the pipe and a front side inclination face that supports the ultrasonic transducer, and propagates ultrasonic waves from the ultrasonic transducer toward the fluid in the pipe, wherein a portion connecting the front-side inclination face and the bottom surface of the acoustic prism has a hollow portion formed on both side surfaces thereof.

(2) A flowmeter sensor comprising an ultrasonic transducer that generates ultrasonic waves, a pipe through which a fluid flows, and an acoustic prism having a bottom surface that is arranged in contact with the outer peripheral surface of the pipe and a front side inclination face that supports the ultrasonic transducer, and propagates ultrasonic waves from the ultrasonic transducer toward the fluid in the pipe, wherein a portion connecting the front-side inclination face and the bottom surface of the acoustic prism is formed such that the width becomes narrower toward the bottom surface side.

(3) A flowmeter sensor according to the above-first or second technical idea, wherein a plurality of legs for holding and fixing the pipe from both sides are integrally protruded from the bottom surface of the prism body constituting the acoustic prism.

(4) A flowmeter sensor comprising an ultrasonic transducer that generates ultrasonic waves, a pipe through which a fluid flows, and an acoustic prism having a bottom surface that is arranged in contact with the outer peripheral surface of the pipe and a front side inclination face that supports the ultrasonic transducer, and propagates ultrasonic waves from the ultrasonic transducer toward the fluid in the pipe, wherein the acoustic prism is made of a heat resistant resin having heat resistance in a temperature range of 90° C. to 200° C. and a positive thermoacoustic characteristics in which the ultrasonic transmittance increases as the temperature rises in such a temperature range.

(5) A flowmeter sensor comprising an ultrasonic transducer that generates ultrasonic waves, a pipe through which a fluid flows, and an acoustic prism having a bottom surface that is arranged in contact with the outer peripheral surface of the pipe and a front-side inclination face that supports the ultrasonic transducer, and propagates ultrasonic waves from the ultrasonic transducer toward the fluid in the pipe, wherein the acoustic prism is made of a heat-resistant resin having heat resistance in a temperature range of 60° C. to 200° C. and a positive thermoacoustic characteristic in which the ultrasonic transmittance increases as the temperature rises in such a temperature range.

DESCRIPTION OF REFERENCE NUMERALS

1: Pipe
11: Flowmeter sensor
61, 61A, 61B, 61C, 61D: Acoustic prism
63: Front side inclination face
64: Ultrasonic transducer
65: Bottom surface
81: Coupling material layer
B1: Ultrasonic wave propagation path
62a: Hollow portion

The invention claimed is:

1. A flowmeter sensor comprising an ultrasonic transducer that generates ultrasonic waves, a pipe through which a fluid flows, and an acoustic prism having a bottom surface that is arranged in contact with the outer peripheral surface of the pipe and a front-side inclination face that supports the ultrasonic transducer, and propagates ultrasonic waves from the ultrasonic transducer toward the fluid in the pipe, wherein the pipe is made of a first heat-resistant resin having heat resistance in a temperature range of 90° C. to 200° C. and negative thermoacoustic characteristics in which the ultrasonic transmittance decreases as the temperature rises in such a temperature range, and the acoustic prism is made of a second heat-resistant resin having heat resistance in a temperature range of 90° C. to 200° C. and positive thermoacoustic characteristics in which the ultrasonic transmittance increases as the temperature rises in such a temperature range.

2. A flowmeter sensor according to claim 1, wherein an ultrasonic wave propagation path is formed by the pipe and the acoustic prism; thereof, the length occupied by the acoustic prism in the entire length of the ultrasonic wave propagation path is greater than that occupied by the pipe in the entire length of the ultrasonic wave propagation path.

3. A flowmeter sensor according to claim 2, wherein the second heat-resistant resin is polyether sulfone, and the first heat-resistant resin is a fluororesin that has a higher heat resistance than the second heat-resistant resin.

4. A flowmeter sensor according to claim 1, wherein a coupling material layer is further provided in contact with the outer peripheral surface of the pipe and the bottom surface of the acoustic prism, said coupling material layer is made of a heat-resistant material having a heat resistance in the temperature range of 90° C. to 200° C.

5. A flowmeter sensor according to claim 4, wherein the heat-resistant material has negative thermoacoustic characteristics in which the ultrasonic wave transmittance decreases as the temperature rises in the temperature range of 90° C. to 200° C.

6. A flowmeter sensor according to claim 5, wherein an ultrasonic wave propagation path is formed by the pipe, the coupling material layer, and the acoustic prism, thereof the length occupied by the acoustic prism over the entire length of the ultrasonic wave propagation path is greater than the sum of the length occupied by the pipe and the length occupied by the coupling material layer in the entire length of the ultrasonic propagation path.

7. A flowmeter sensor according to claim 6, wherein the second heat-resistant resin is polyether sulfone, the first heat-resistant resin is a fluororesin having a higher heat resistance than the second heat-resistant resin, and the heat-resistant material is a fluororubber having a higher heat resistance than the second heat-resistant resin.

8. A flowmeter sensor according to claim 1, wherein an intermediate portion connecting the front-side inclination face and the bottom surface of the acoustic prism has a hollow portion formed on both sides.

9. A flowmeter sensor according to claim 1, wherein an intermediate portion connecting the front-side inclination face and the bottom surface in the acoustic prism has a width that becomes narrower toward the bottom surface side.

10. A flowmeter sensor according to claim 1, wherein the ultrasonic transducer is made of a porous body of alkali niobate-based piezoelectric ceramics.

* * * * *